United States Patent [19]
van de Veen

[11] Patent Number: 5,391,953
[45] Date of Patent: Feb. 21, 1995

[54] ELECTROMECHANICAL TRANSDUCER

[75] Inventor: Paul G. van de Veen, Enschede, Netherlands

[73] Assignee: Otto Bock Orthopadische Industrie Besitz und Verwaltungs Kommanditgesellschaft, Germany

[21] Appl. No.: 992,933

[22] Filed: Dec. 18, 1992

[30] Foreign Application Priority Data

Jun. 19, 1990 [NL] Netherlands .................. 90.01394

[51] Int. Cl.$^6$ .................. H02K 11/00; H02K 7/06; H02K 7/10; G05B 11/01
[52] U.S. Cl. .................. 310/80; 310/68 R; 310/68 B; 318/628
[58] Field of Search .......... 310/68 R, 68 B, 69, 310/80, 83; 318/138, 685, 628; 74/414.8 R, 414.8 VA

[56] References Cited

U.S. PATENT DOCUMENTS

| | | | |
|---|---|---|---|
| 564,437 | 7/1896 | Macbeth | 310/69 |
| 2,783,643 | 3/1957 | Sihvonen | 310/93 |
| 3,557,387 | 1/1971 | Ohlenbusch et al. | 623/24 |
| 3,559,027 | 1/1971 | Arsem | 310/15 |
| 3,628,120 | 12/1971 | Fredriksen | 318/685 |
| 4,019,616 | 4/1977 | Thorne | 74/424.8 R |
| 4,223,255 | 9/1980 | Goldman et al. | 310/138 |
| 4,431,093 | 2/1984 | Yang | 74/424.8 R |
| 4,578,606 | 3/1986 | Welterlin | 310/68 R |
| 4,947,070 | 8/1990 | Hill et al. | 310/80 |
| 5,041,748 | 8/1991 | Huber | 310/80 |
| 5,053,685 | 10/1991 | Bacchi | 310/80 |
| 5,125,280 | 6/1992 | Koscinski et al. | 74/424.8 R |

FOREIGN PATENT DOCUMENTS

| | | | |
|---|---|---|---|
| 2336078 | 2/1975 | Germany . | |
| 2743908 | 4/1979 | Germany | 310/80 |
| 3522221 | 2/1986 | Germany . | |
| 0311845 | 12/1989 | Japan | 310/90 |
| 1282568 | 7/1972 | United Kingdom . | |

*Primary Examiner*—Steven L. Stephan
*Assistant Examiner*—Clay LaBalle
*Attorney, Agent, or Firm*—Willian Brinks Hofer Gilson & Lione

[57] ABSTRACT

An electromechanical transducer having a first element movable in relation to a second element, wherein the first and second elements perform a translational movement relative to one another. A transducer element mechanically coupled to the first element and second elements for converting the translational movement into an electrical signal. A transmission element converting the relative translational movement of the first and second elements into a rotating movement of the transducer element so as to produce the electrical signal.

13 Claims, 1 Drawing Sheet

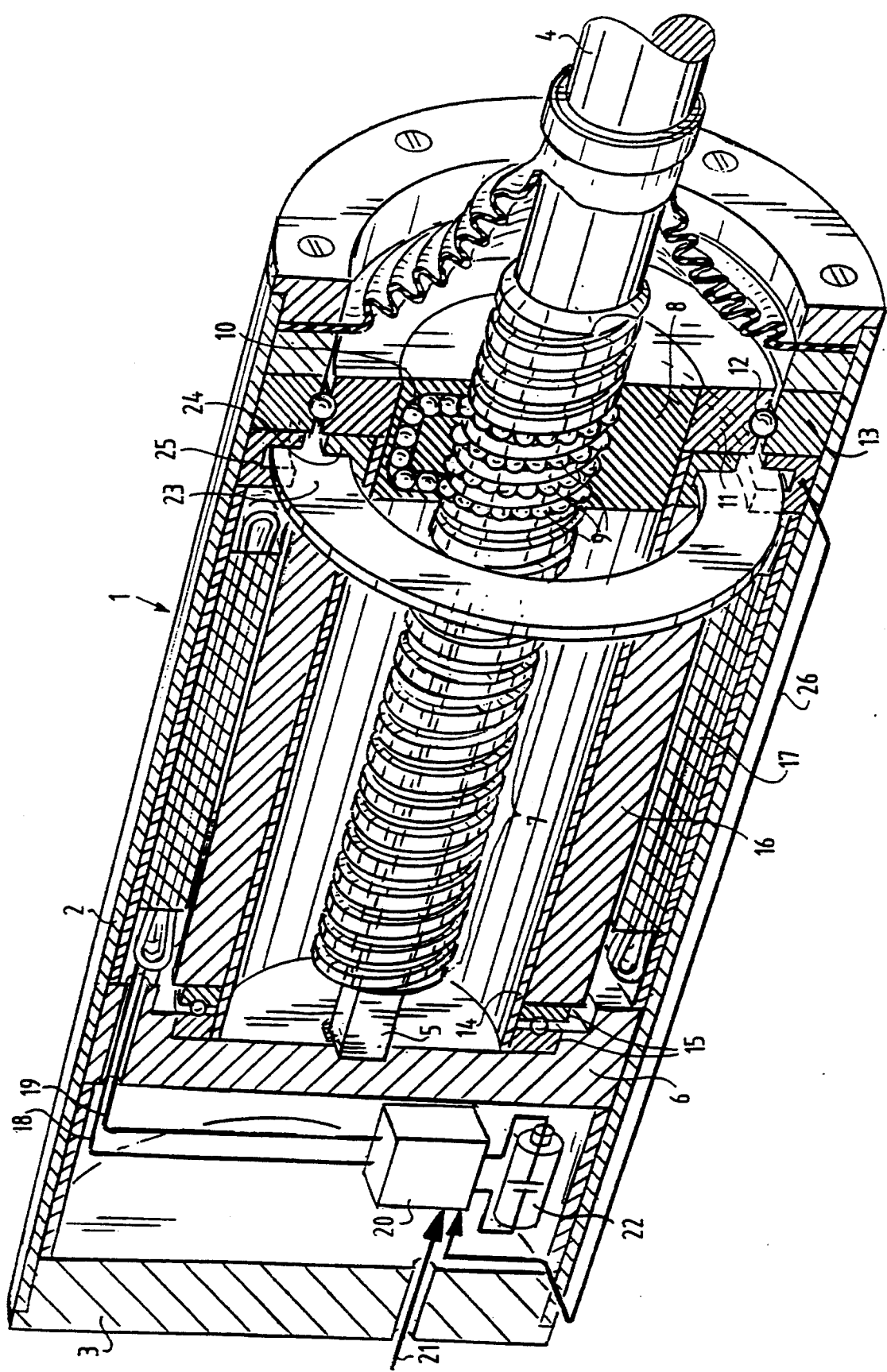

ELECTROMECHANICAL TRANSDUCER

Applicant claims, under 35 U.S.C. §120, the benefit of priority of the filing date of Jun. 17, 1991, of International Patent Application PCT/NL91/00099, copy attached, filed on the aforementioned date, the entire contents of which are incorporated herein by reference. Applicant also claims, under 35 U.S.C. §119, the benefit of priority of the filing date of Jun. 19, 1990, of Netherlands Patent Application No. 9001394, filed on the aforementioned date, the entire contents of which are incorporated herein by reference.

BACKGROUND OF THE INVENTION

The invention relates to an electromechanical transducer, for example a motor or generator, for converting mechanical energy into electrical energy and vice versa. The electromechanical transducer according to the invention dissipates kinetic energy so as to exert a damping action on the movable elements of the transducer. Such a transducer is known in various embodiments.

An object of the invention is to embody a transducer such that the resolution and the accuracy are improved.

The invention further has for its object to embody a transducer such that it is universally applicable, and allows for adjustment to the most diverse requirements and conditions of use without the necessity of adjustment in the transducer itself for this purpose, this being done via a control system.

The invention has for its further object to embody a transducer such that it has the same external form as a known device which has the same functional operation, for example a known damper on a basis of liquid or gas.

SUMMARY OF THE INVENTION

These and other objectives to be stated hereinafter are generally realized according to the invention which is directed to an electromechanical transducer comprising a first element movable in relation to a second element, wherein the first and second elements perform a translational movement relative to one another. A transducer element mechanically coupled to the first and second elements for converting the translational movement into an electrical signal. Furthermore, a transmission element converts the relative translational movement of the first and second elements into a rotating movement of the transducer element so as to produce the electrical signal.

The transducer means or element can in principle be of any suitable type. According to the invention, however, preference is given to an embodiment wherein the transducer means or element comprises a brushless motor. The transducer means or element can be of the linear type, such as in the form of a linear motor.

However, when the electromechanical transducer acts as a damping device, the transducer means or element is a rotation motor. Furthermore, a transmission means or element is present for converting a linear movement of the movable elements into a rotating movement of the transducer means or element. A greater resolution can be achieved with such an embodiment. This can benefit the accuracy of the device.

A very reliable and almost frictionless transmission is obtained in an embodiment wherein the transmission means or element comprises a screw means or element, for example a ball circulation spindle.

To achieve the greatest possible flexibility the device comprises a central control unit, in particular a computer, coupled to the electrical terminals. This computer can be placed externally or be integrated into the electromechanical transducer, in which case it will necessarily have to have relatively small dimensions.

The use of a central control unit also offers the possibility of external control. For this purpose the transducer according to the invention has the feature that the central control unit is provided with control terminals for receiving external control signals. The external control signals may come from temperature sensors, dynamometers and the like.

For example, in rehabilitation technology an electromechanical transducer according to the invention operating as a damping device can be embodied such that the control terminals of the control unit are equipped to receive and process muscle signals. Diverse attempts have been made in this field to design dampers which, using simple means, allow for adaptation to predetermined requirements and to varying operating conditions. It has been found from these attempts that the following problems, among others, occur in the design of such dampers. A motor or actuator needs control energy. However, an electromechanical transducer according to the present invention operating as a damping device comprises an accumulator connected to the electrical terminals of the transducer means or element such that it can store the electrical energy generated by the transducer means or element.

In particular, the electromechanical transducer according to the present invention can have the feature that the accumulator is connected for power supply to the central control unit.

By using the above described energy recovery according to the present invention a considerable saving can be made in battery weight and volume.

The known controls operate slowly, which makes it particularly difficult to react quickly to changing situations during walking. The before-mentioned attempts in rehabilitation technology have resulted in programs to anticipate the mechanical changes during walking. The exceptionally rapid control possibilities of the electromechanical transducer according to the invention solve these problems to a significant extent.

For the best possible control of the operation of the electromechanical transducer according to the invention, for example when it is used as damper in rehabilitation technology, it is important to know the mechanical situation of the transducer. To this end the electromechanical transducer comprises a measuring means or device for measuring the relative mechanical situation or state of the movable elements, such as position, speed, acceleration and the generating of the signals representative of this mechanical situation or state, which can be supplied to the control terminals of the central control unit.

In a particular embodiment, the above-mentioned electromechanical transducer has the feature that the measuring means or device comprises a rotation measuring means or device, for example a tacho generator or Hall generator. It is noted here that in principle other measuring means or devices may also be considered suitable, such as electrical or optical pulsators.

As already briefly discussed, the electromechanical transducer according to the present invention can generate energy during the mutual movement of the movable elements. This energy can be dissipated in for example a resistive load, but according to the invention can also be generated to an accumulator connected to the electrical terminals of the transducer means or element such that electrical energy generated by the transducer means or element can be stored.

In the above-mentioned embodiment wherein the accumulator is connected for power supply to the central control unit, further power supply means can be dispensed with.

Another use for the energy stored in the accumulator is obtained with a variant wherein the accumulator is connected for feeding, under the control of the central control unit, electrical energy to the transducer means or element in a direction opposed to the direction wherein the transducer means or element generates energy during relative movement of the movable elements. During use as a damping device, a negative damping can be obtained herewith by reverse actuation of the transducer means or element, which in this case will function temporarily as a motor.

Finally, the electromechanical transducer according to the present invention can display the feature that the electromechanical transducer has substantially the same external form as a known damping device. The external form of the transducer according to the invention can in general be simply adapted to user requirements. The designer has for instance the freedom to make the external form almost identical to existing passive dampers. This is of course beneficial to easy exchangeability.

The electromechanical transducer according to the invention lends itself to the use of the electrical energy generated during mechanical excitation for supplying a control system that can for example be incorporated in the damper.

The invention will now be elucidated with reference to the annexed figure.

BRIEF DESCRIPTION OF THE DRAWING

The sole figure shows a random embodiment of an adjustable damping device according to an embodiment of the electromechanical transducer functioning as an invention in partially broken away perspective view.

EMBODIMENT OF THE INVENTION

The electromechanical transducer 1 according to the invention comprises a cylindrical housing 2 with an end wall 3 to which mounting means can be connected. These are not drawn here. The electromechanical transducer 1 further comprises a shaft 4, whereof the free end protruding outside the electromechanical transducer 1 can be provided with mounting means likewise not drawn here.

The shaft 4 is placed co-axially relative to the housing 2 and movable relative thereto in an axial direction. For this purpose the shaft 4 takes a hollow form and is slidable over a second shaft 5 with a rectangular cross section, whereby the shaft 4 is blocked against rotation. The shaft 5 is mounted on a wall 6 which is rigidly coupled to the housing 2.

The shaft 4 has an external screw thread 7 which forms a ball circulation bearing together with a bearing block 8 and steel balls 9. Such a bearing is per se known. When the shaft 4 moves in axial direction relative to the housing 2, a movement of balls 9 takes place via a channel 10 in the bearing block 8 which, due to the rotational locking of the shaft 4, has the result that the bearing block 8 is set into rotation. This rotation is, given the fixed pitch of the screw thread 7, directly proportional to the linear movement of the shaft 4.

Coupled to the bearing block 8 is a bearing ring 11 which has a ball bearing with balls 12 co-acting with a second bearing ring 13 which is in turn fixedly coupled in the housing 2.

Coupled to the bearing block 8 is a tube 14 which is rotatably mounted on its end facing the wall 6 by means of a ball bearing 15. A cylindrical magnet unit 16 is arranged on the outside of the tube 14. It will be apparent after the above explanation that the magnet unit 16 will undergo a rotation through axial displacement of the shaft 4, this being related to the position of the housing 2.

Accommodated between the outer surface of the cylindrical magnet unit 16 and the inner surface of the housing 2 is a stator winding 17. In a per se known manner, a voltage can be induced in the stator winding 17 by rotation of the magnet unit 16. This voltage can be fed via lines 18, 19 to an electronic unit 20 which is arranged in the space enclosed by the end wall 3, the wall 6 and the housing 2.

The electronic unit 20 comprises an electric load for the stator winding 17 and a central control unit or CPU, which can be programmed in advance. The central control unit can also receive external control signals, such as muscle signals, via an input cable 21.

Also situated in the space wherein the electronic unit 20 is arranged is a rechargeable battery 22 which can serve on the one hand as electric load for the stator winding 17 and on the other for supplying electrical energy to the electronic unit 20. The energy stored in the battery 22 can be used in some conditions to supply current via the electronic unit 20 to the stator winding 17, whereby the electromechanical transducer 1 temporarily obtains the function of motor, or a member with negative damping which can be desirable in certain conditions for controlling complex movements.

The functions briefly described above can all take place under program control. A program can be entered in advance into the electronic unit 20 which for this purpose can for instance comprise a microprocessor. Through coupling to a control system, for example on the basis of a microprocessor, all mechanical functions can be very simply monitored and continuously readjusted during complicated operating conditions which can occur for example during use as damper in orthopaedics. An external computer can also be used which can communicate via the input cable 21 with the electronic unit 20. It will be apparent that in that case the cable 21 must be able to transport information to two directions.

For optimal control of particular movements the relative axial position of the shaft 4 relative to the housing 2 usually has to be known. The electromechanical transducer 1 comprises thereto a Hall generator which allows for integration into the electromechanical transducer while occupying very little space. The Hall generator is designated schematically and comprises a rotor ring 23, which is fixed with its inside to the bearing block 8 and a fastening ring 24 arranged on the tube 14, in addition to a Hall ring 25 which via a signal line 26 can generate to the electronic unit 20 a signal representative of the rotation position of the rotor ring 24 relative to the housing 2.

It is noted that many variants are possible within the scope of the invention. The ball circulation construction is chosen to obtain a high transmission accuracy and little friction. The described electromechanical transducer can also be implemented in a completely different manner. The construction of the stator and the rotor can for example be reversed or combined forms can be used.

Electromechanical transducers of the present type exist in different embodiments. Three basic types can be distinguished:

1. A rotor with permanent magnet and a stator with electrical winding.
2. A rotor with electrical winding and a stator with electrical winding.
3. A rotor with electrical winding and a stator with permanent magnet.

In electromechanical transducers according to types 2 and 3, a commutator has to be used for alternating connection of different stator windings to the external electrical circuit. Since commutators by their nature introduce friction, they are considered less suitable for use within the scope of the invention. A type 1 electromechanical transducer does not need a commutator and therefore seems in the first instance the most suitable for application within the framework of the invention. In principle, however, the absence of a commutator would eliminate the possibility of also having the device operate as motor, and thus of applying negative damping. In order to nevertheless realize this possibility without a commutator the electronic unit 20 must be embodied such that the commutation function is assumed by the unit. In the embodiment drawn this is realized by the Hall generator 23, 25. In this embodiment therefore the advantage of a very low rotational friction is combined with the possibility of negative damping.

Attention is finally drawn to the fact that the present invention is not limited to linear movements but also relates to devices with two displaceable elements which can perform a different movement relative to one another, for example a rotating movement. In this respect it will be apparent without further elucidation that for this purpose the use of the ball circulation construction could be dispensed with and the rotating movements of the housing 2 relative to, for instance, the first bearing ring 11 can be used. The ball circulation spindle serves in any case only for converting a linear movement into a rotating movement and vice versa.

Examples for application of the transducer according to the present invention can be mentioned: a motor, a damper, for example for use in orthopaedic technology and rehabilitation technology, a temperature-independent door check, a shock absorber, an actuator in robotics technology. It will be apparent that these represent only several random examples of application.

It is intended that the foregoing detailed description be regarded as illustrative rather than limiting, and that it be understood that it is the following claims, including all equivalents, which are intended to define the scope of the invention.

I claim:

1. An electromechanical transducer, comprising:
   a first element movable in relation to a second element, wherein said first and said second elements perform a translational movement relative to one another;
   a transducer element mechanically coupled to said first element and said second element for converting said translational movement into an electrical signal;
   a transmission element converting said relative translational movement of said first and second elements into a rotating movement of said transducer element so as to produce said electrical signal;
   a feed line to receive said electrical signal from said transducer element;
   a rechargeable battery connected to said feed line so as to receive said electrical signal and store electrical energy associated with said electrical signal;
   a control unit having control terminals, said control unit coupled to said feed line and connected to said battery for receiving power therefrom; and
   a measuring device for 1) measuring the relative mechanical state of said first element and said second element, such as position, speed, acceleration and 2) generating signals representative of said mechanical state to be fed to said control terminals of said control unit.

2. The electromechanical transducer of claim 1, wherein said transmission element converts said rotating movement of said transducer element into said translational movement of said first and second elements.

3. The electromechanical transducer of claim 1, wherein said transducer element comprises a brushless motor.

4. The electromechanical transducer of claim 1, wherein said transmission element comprises a screw element.

5. The electromechanical transducer of claim 4, wherein said screw element comprises a ball circulation spindle.

6. The electromechanical transducer of claim 1, wherein said transducer element comprises an electrical terminal.

7. The electromechanical transducer of claim 6, said control unit coupled to said electrical terminal of said transducer element.

8. The electromechanical transducer of claim 7, wherein said control unit comprises a computer.

9. The electromechanical transducer of claim 1, said measuring device comprising a rotation measuring device.

10. The electromechanical transducer of claim 9, said rotation measuring device comprises a tacho generator.

11. The electromechanical transducer of claim 9, said rotation measuring device comprises a Hall generator.

12. The electromechanical transducer of claim 1, wherein said stored electrical energy is used for dampening.

13. The electromechanical transducer of claim 1, wherein said battery is connected to said transducer element to supply electrical energy to said transducer, wherein said supply of electrical energy is controlled by said control unit and is supplied in a direction opposite to the direction said transducer element supplies electrical energy during relative movement of said first and said second elements so as to generate a damping motion.

* * * * *